(12) United States Patent
Lesperance et al.

(10) Patent No.: US 9,718,547 B2
(45) Date of Patent: Aug. 1, 2017

(54) SYSTEM AND METHOD FOR DETERMINING A LENGTH OF AN EXTERNAL LOAD SLING

(71) Applicant: Sikorsky Aircraft Corporation, Stratford, CT (US)

(72) Inventors: Jesse J. Lesperance, Harvest, AL (US); Thomas Zygmant, Southport, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 51 days.

(21) Appl. No.: 14/823,093

(22) Filed: Aug. 11, 2015

(65) Prior Publication Data

US 2016/0048131 A1 Feb. 18, 2016

Related U.S. Application Data

(60) Provisional application No. 62/036,156, filed on Aug. 12, 2014.

(51) Int. Cl.
*G05D 1/00* (2006.01)
*B64D 1/22* (2006.01)

(52) U.S. Cl.
CPC .................. *B64D 1/22* (2013.01)

(58) Field of Classification Search
CPC ........................................................ B64D 1/22
See application file for complete search history.

(56) References Cited

U.S. PATENT DOCUMENTS

| 4,695,012 A * | 9/1987 | Lindenbaum ............. B64B 1/24 244/137.4 |
| 5,465,925 A | 11/1995 | Connolly et al. |
| 8,643,850 B1 * | 2/2014 | Hartman ............... B66C 13/085 342/29 |
| 9,146,557 B1 * | 9/2015 | Ahmed .................. G05D 1/101 |
| 9,223,008 B1 * | 12/2015 | Hartman ................. G01S 5/163 |
| 9,315,268 B2 * | 4/2016 | Sane ......................... B64D 1/12 |
| 9,376,291 B2 * | 6/2016 | Laurens ................ B66C 23/207 |
| 2009/0146010 A1 * | 6/2009 | Cohen ...................... B64D 1/22 244/137.1 |
| 2010/0051890 A1 * | 3/2010 | Lauder .................... B64C 27/10 254/382 |

(Continued)

FOREIGN PATENT DOCUMENTS

EP 1989107 A2 * 11/2008 ............... B64D 1/22

*Primary Examiner* — Nicholas Kiswanto
*Assistant Examiner* — Kenny A Taveras
(74) *Attorney, Agent, or Firm* — Cantor Colburn LLP

(57) ABSTRACT

A system and method for determining length of load sling assembly in an aircraft, includes receiving, with a processor, information via one or more sensors regarding a load length during a delivery and descent state, the load length comprising length of a load sling assembly and a load height; controlling, with the processor, a minimum altitude of operation of the aircraft that ensures that the load does not touch the ground or obstacles during one or more of a flight plan, during decent, or during delivery; determining, with the processor, when a load has touched a ground in response to the receiving of the load length information; and releasing, with the processor, the load from the load sling assembly when the processor determines that the load has touched the ground.

14 Claims, 3 Drawing Sheets

(56) References Cited

U.S. PATENT DOCUMENTS

| | | | |
|---|---|---|---|
| 2010/0140412 A1* | 6/2010 | Certain | B64D 1/22 244/137.4 |
| 2013/0054054 A1* | 2/2013 | Tollenaere | G05D 1/0858 701/3 |
| 2013/0056586 A1 | 3/2013 | Occhiato et al. | |
| 2013/0299640 A1* | 11/2013 | Kelly | B66C 1/38 244/137.4 |
| 2015/0014485 A1* | 1/2015 | Prud'Homme-Lacroix | B64C 1/22 244/137.4 |
| 2015/0151837 A1* | 6/2015 | Sane | B64D 1/12 701/3 |
| 2015/0285767 A1* | 10/2015 | Ouellette | G01R 33/04 324/240 |
| 2016/0048131 A1* | 2/2016 | Lesperance | B64D 1/22 701/8 |

\* cited by examiner

SYSTEM AND METHOD FOR DETERMINING A LENGTH OF AN EXTERNAL LOAD SLING

CROSS-REFERENCE TO RELATED APPLICATIONS

This application claims the benefit of U.S. provisional patent application Ser. No. 62/036,156, filed Aug. 12, 2014, the entire contents of which are incorporated herein by reference.

BACKGROUND

The subject matter disclosed herein relates to load-management systems in a vertical take-off and landing (VTOL) aircraft, and to a system and method for determining external sling length for cargo during automated external sling load delivery via an autonomous VTOL aircraft.

DESCRIPTION OF RELATED ART

Typically, a utility VTOL aircraft's ability to carry cargo is one of its most important features. The VTOL aircraft, e.g., a helicopter, can be typically equipped to carry large, long, or oddly shaped cargo on an external sling provided that the cargo is within the lifting capacity of the aircraft. A significant advantage associated with this lifting capability is that a load may be picked up from or delivered to locations where access by other forms of transportation is difficult or impossible. Additionally, the systems do not require the VTOL aircraft to land to deliver or pick up the cargo.

In external cargo operations, picking up, or delivering cargo requires three to four people to maneuver the aircraft: a pilot and/or co-pilot, a crew chief (if cabin equipped), and a load master (on the ground) maneuver the aircraft into place for attaching the sling to external cargo during picking up and/or providing directions to avoid obstacles during pickup/delivery of the cargo. Prior and during the pickup/delivery, the crew establishes certain parameters of the external load required by the pilot(s) for flight and subsequent pickup/delivery. An autonomous VTOL aircraft can include manned and unmanned aircraft. In an unmanned VTOL aircraft, there is no flight crew to coordinate these maneuvers for delivery and pick-up of loads. So, the three to four people in a manned aircraft may not be available in an unmanned aircraft to maneuver the aircraft and the load and provide necessary parameters. Even in an autonomous manned vehicle, additional information for maneuvering the aircraft can provide robust operational capability in the field. Therefore, there is a need for a system that can provide the autonomous VTOL aircraft with necessary parameters in relation to an external sling load for automated delivery and pick up of loads.

BRIEF SUMMARY

According to an embodiment of the invention, a method for determining length of load sling assembly in an aircraft, includes receiving, with a processor, information via one or more sensors regarding a load length during a delivery and descent state, the load length comprising length of a load sling assembly and a load height; controlling, with the processor, a minimum altitude of operation of the aircraft that ensures that the load does not touch the ground or obstacles during one or more of a flight plan, during decent, or during delivery; determining, with the processor, when a load has touched a ground in response to the receiving of the load length information; and releasing, with the processor, the load from the load sling assembly when the processor determines that the load has touched the ground.

According to another embodiment of the invention, a system for determining length of load sling assembly in an aircraft with one or more sensors coupled to the aircraft; the load sling assembly including a sling coupled to an attachment device and a load; and memory having instructions stored thereon that, when executed by the processor, cause the system to receive information regarding a load length during a delivery and descent state, the load length comprising a length of the load sling assembly and a load height; control a minimum altitude of operation of the aircraft that ensures that the load does not touch the ground or obstacles during one or more of a flight plan, during decent, or during delivery; determine when a load has touched a ground in response to the receiving of the load length information; and release the load from the load sling assembly when the processor determines that the load has touched the ground.

In addition to one or more of the features described above, or as an alternative, further embodiments could include determining the load height during an initial descent state.

In addition to one or more of the features described above, or as an alternative, further embodiments could include determining of the load height during the initial descent state further comprises determining the load height from one or more of a distance of the aircraft to each of the load, a pendant, a bucket height factor, and the ground.

In addition to one or more of the features described above, or as an alternative, further embodiments could include receiving information regarding the load height during a lift state.

In addition to one or more of the features described above, or as an alternative, further embodiments could include determining the load height as a function of a distance of the aircraft to the load and a distance of the aircraft to the ground.

In addition to one or more of the features described above, or as an alternative, further embodiments could include determining the load length through successive iterations of the difference between the distance between the aircraft to each of the load and the pendant.

In addition to one or more of the features described above, or as an alternative, further embodiments could include navigating the load to a landing site in response to receiving the load length information during the delivery and descent state.

Technical function of various embodiments includes determining the sling load length from one or more sensors on board a VTOL aircraft. Sensors provide a flight control system with information when the load is off the ground prior to executing a departure, that adequate ground clearance is provided throughout the mission so that the load does not hit any obstacles in the VTOL aircraft's path, and when the load is placed on the ground and can be released.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION OF THE INVENTION

Embodiments of a flight control system coupled to a suspension system of an autonomous VTOL aircraft or an unmanned VTOL aircraft includes one or more algorithms for determining a length of an external cargo sling and total load length with exemplary embodiments are discussed below in detail. The suspension system includes an external load sling with a pendant that can be selectively coupled to an external load at the bottom of the VTOL aircraft and receives information related to sensors and load in order to determine load height, load length, and cargo sling length for automated external sling load delivery for the autonomous VTOL aircraft. The information can be used to provide a flight control system with critical information for mission management safety margins, flight dynamics, and the like.

Figure 1:
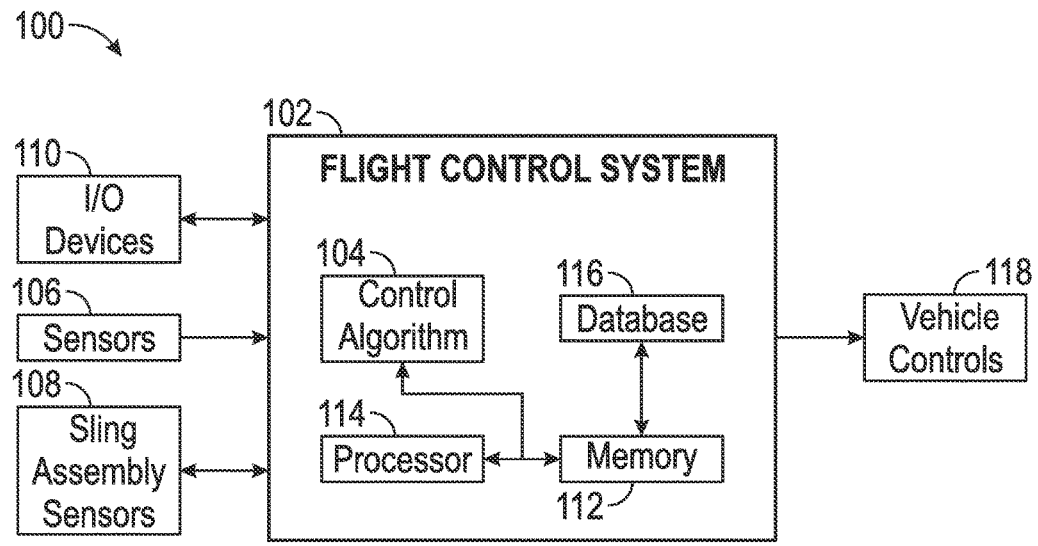
FIG. 1 illustrates a schematic block diagram of a system in accordance with an embodiment of the invention.
Figure 2:
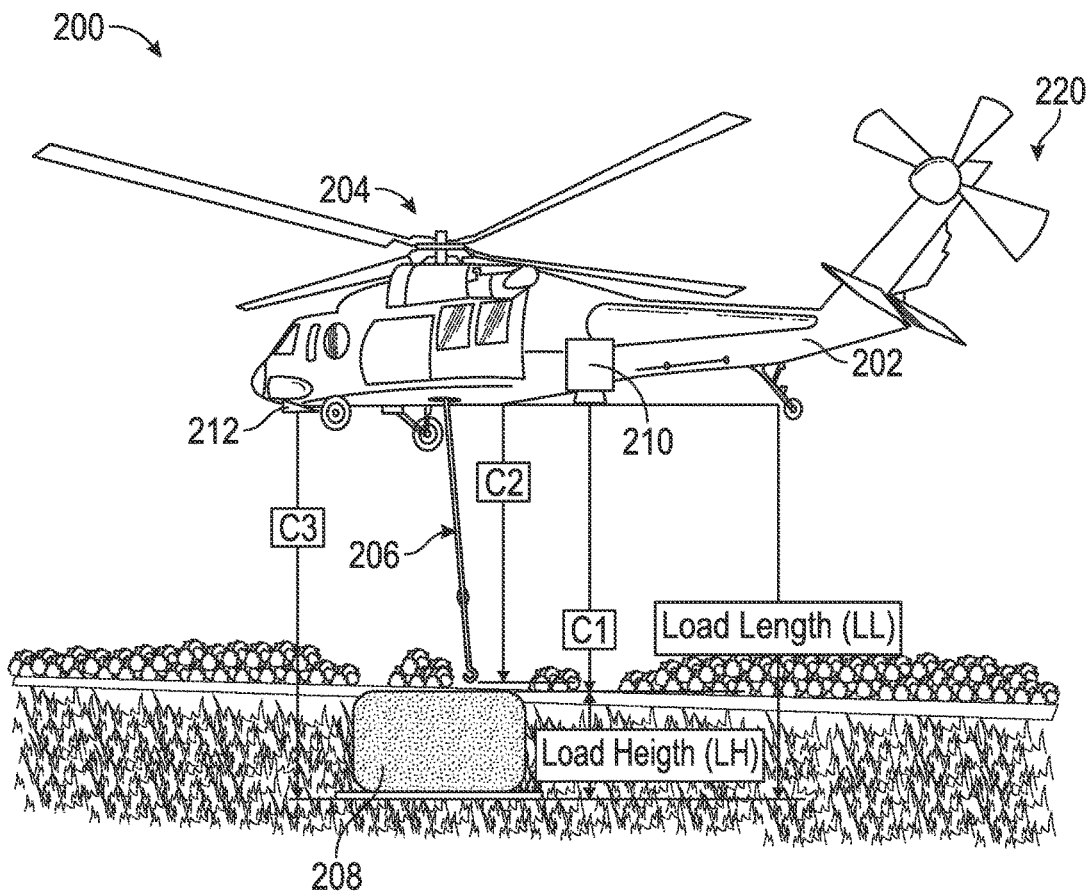
FIG. 2 is a view of a VTOL aircraft that is shown in a descent state for initial pick-up of an external cargo in accordance with an embodiment of the invention.
Figure 3:
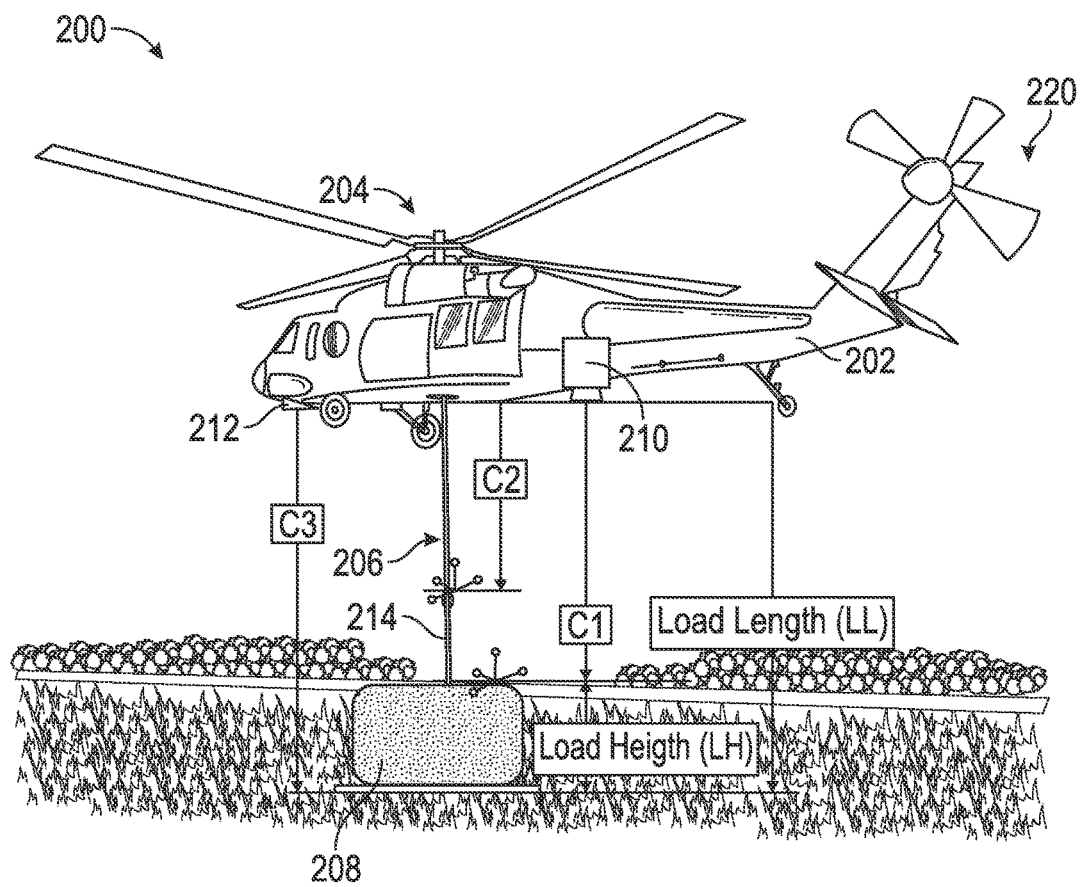
FIG. 3 is a view of a VTOL aircraft that is shown in a lift state in accordance with an embodiment of the invention.
Figure 4:
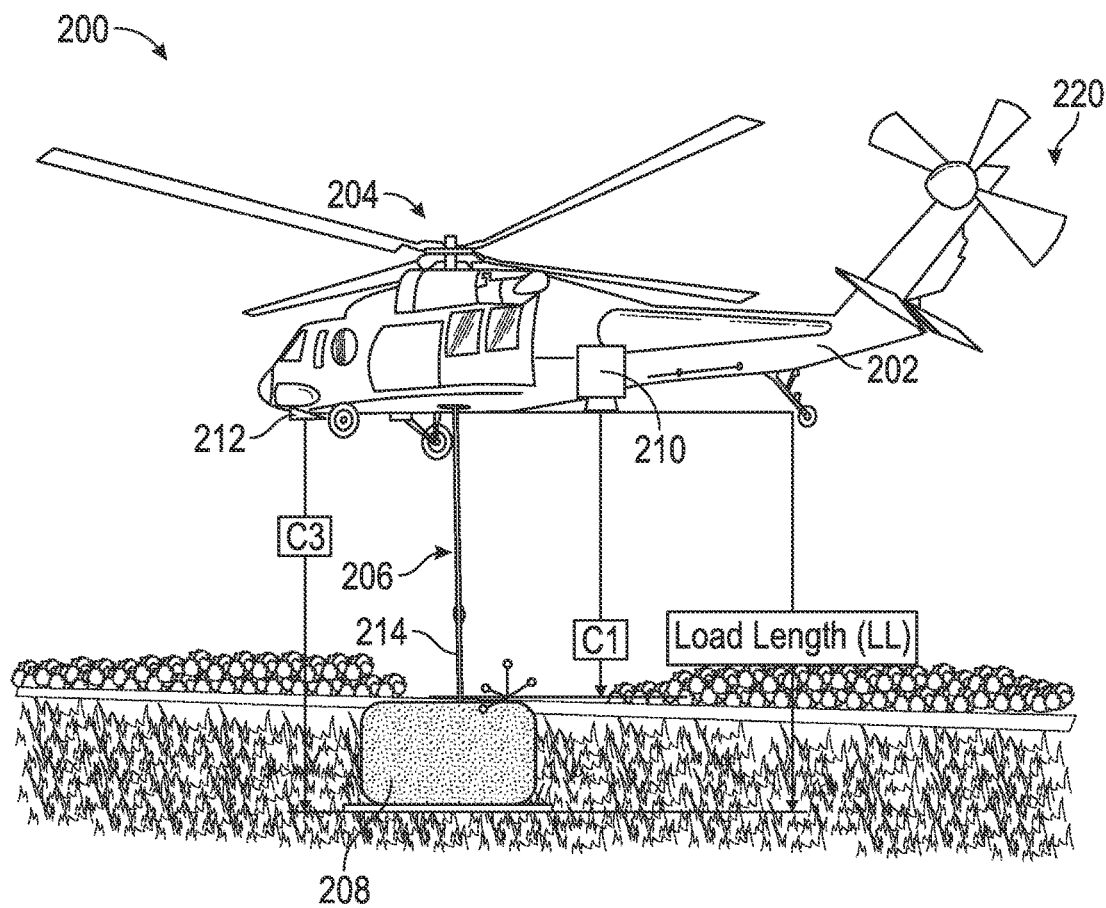
FIG. 4 is a view of a VTOL aircraft that is show in a delivery and descent state in accordance with an embodiment of the invention.

Referring to the drawings, FIG. 1 illustrates a schematic block diagram of a control system 100 on board an autonomous vertical take-off and landing (VTOL) aircraft 200 (hereinafter "VTOL aircraft 200") (FIGS. 2-4) in accordance with an exemplary embodiment. VTOL aircraft 200 can include a manned autonomous vehicle as well as an unmanned autonomous vehicle. As control system 100 is implemented on board VTOL aircraft 200 (FIGS. 2-4) for determining sling length and load in relation to aircraft, FIGS. 2-4 are also being referenced in this description of control system 100 of FIG. 1.

As illustrated, control system 100 includes a Flight Control System 102 ("FCS 102") that executes instructions for implementing a control algorithm 104 that determines, in some non-limiting examples, load height, load length, and cargo sling length and maneuvers VTOL aircraft 200 for automated external sling load or cargo delivery for VTOL aircraft 200. FCS 102 may receive real-time information acquired from sensors 106 that may be used to acquire sensor information related to VTOL aircraft 200 and a load on the ground. Sensors 106 can include LIght Detection And Ranging (LIDAR), LAser Detection And Ranging (LADAR), Radio Detection And Ranging (RADAR) altimeter, gyroscopes, accelerometers, positional sensors, an inertial measurement unit (IMU), or the like. Sensor information data received by FCS 102 can include a current geographical location of VTOL aircraft 200, height on top of a load above ground level, distance of VTOL aircraft 200 to a pendant at an end of a sling, infrared cameras, visual based cameras, or radar type sensors with focused beams on the ground and loads for information on the load with respect to VTOL aircraft 200, and data related to mapped geographical terrain. Sensor information can be used to provide information on an external load as well as for path planning of VTOL aircraft 200. Additional navigation systems on VTOL aircraft 200 can include GPS or the like to provide enhanced positional awareness for VTOL aircraft 200. Flight control system 102 may also receive real-time force information from one or more sensor devices 108 attached to sling assembly such as, e.g., strain gauge load cells embedded in pendants at an end of a cargo sling assembly 206 to provide sensor information related to weight on pendant and load on pendant.

FCS 102 includes a memory 112 that communicates with a processor 114. Memory 112 may store control algorithm 104 as executable instructions that are executed by processor 114. The executable instructions may be stored or organized in any manner and at any level of abstraction, such as in connection with the execution of control algorithm 104. Processor 114 may be any type of processor such as a central processing unit (CPU) or a graphics processing unit (GPU), including a general purpose processor, a digital signal processor (DSP), a microcontroller, an application specific integrated circuit (ASIC), a field programmable gate array (FPGA), or the like. Also, in embodiments, memory 112 may include random access memory (RAM), read only memory (ROM), or other electronic, optical, magnetic, or any other computer readable medium onto which is stored control algorithm 104 described below.

Control system 100 may include a database 116. Database 116 may be used to store information acquired by VTOL aircraft 200 during flight maneuvers including information acquired by one or more sensors related to a condition of cargo and its relation to VTOL aircraft 200 during maneuvers. Database 116 may also store information on real time data acquired by sensors 106, 108. The data stored in database 116 may be based on one or more other algorithms or processes for implementing control algorithm 104. For example, in some embodiments data stored in database 116 may be a result of processor 114 having subjected the received data to one or more filtration processes. Database 116 may be used for any number of reasons. For example, Database 116 may be used to temporarily or permanently store data, to provide a record or log of the data stored therein for subsequent examination or analysis, etc. In some embodiments, Database 116 may store a relationship between data, such as one or more links between data or sets of data acquired on board VTOL aircraft 200.

Control system 100 may provide one or more controls, such as vehicle controls 118. Vehicle controls 118 may provide directives based on, e.g., navigating, and/or maneuvering VTOL aircraft 200 during a plurality of flight states such as, e.g., initial descent state for picking-up cargo, lift state after cargo has been acquired, and delivery descent state for delivering cargo to a location and releasing the cargo hook. The directives may be presented on one or more input/output (I/O) devices 110. I I/O devices 110 may include a display device or screen, audio speakers, a graphical user interface (GUI), etc. For a manned VTOL aircraft 200, I/O 110 devices can be located on the VTOL aircraft 200 while for an unmanned VTOL aircraft 200, I/O devices 110 may be remotely located from VTOL aircraft 200, for example, on the ground. In some embodiments, the I/O devices 110 may be used to enter or adjust a linking between data or sets of data. It is to be appreciated that the system 100 is illustrative. In some embodiments, additional components or entities not shown in FIG. 1 may be included. In some embodiments, one or more of the components or entities may be optional.

FIGS. 2-4 illustrate an exemplary view of VTOL aircraft 200 for implementing various embodiments described herein. VTOL aircraft 200 includes an airframe 202 with a main rotor system 204 and a tail rotor system 220. Main rotor system 204 provides thrust while tail-rotor system provides anti-torque to counteract rotor torque on airframe 202 created by main rotor 204. Although a particular configuration of VTOL aircraft 200 is illustrated and described in the disclosed embodiments, it will be appreciated that other configurations and/or machines include autonomous and semi-autonomous aircraft that may operate over land or water including fixed-wing aircraft, tilt rotor, and rotary-wing aircraft may also benefit from embodiments disclosed.

Referring to FIG. 2, shown is VTOL aircraft 200 during an initial descent state for picking-up cargo or load 208 in accordance with an embodiment of the invention. VTOL aircraft 200 can include one or more devices 210-212 associated with sensors 106 and 108 that provide information to FCS 102, related to aircraft state, distance from aircraft to top of load C1, distance from aircraft to pendant C2, and distance from aircraft to ground C3. As such, FIG. 1 is also referenced in the description of FIG. 2. In an embodiment, VTOL aircraft 200 can include additional sensors associated with devices 210-212 in order to provide additional flight information and load information for processing by FCS 102.

In an initial descent state, VTOL aircraft 200 can descend to a point to approach load 208 with a suspension system attached. Suspension system can include, for example, a cable or sling having a defined or undefined length of cable with an attachment device at a distal end of sling (collectively referred to as "sling assembly 206") that defines a sling length. In embodiments, attachment device can be a pendant or other similar device for coupling to top of load 208 with a nominal height, a set predefined value, or an unknown value. In an embodiment, sling length can include an additional chain or device 214 that represents a bucket height factor (BF) (shown in FIGS. 3-4). As VTOL aircraft 200 descends, sensors 106 and 108 associated with device 210-212 provide information to FCS 102 for implementing control algorithm 104, by processor 114, in order to determine load height (LH) and minimum altitude (Min Alt) for VTOL aircraft 200 for implementation during descent state or for a load release in a delivery and descent state. Load height (LH) and Minimum altitude (Min Alt) can be determined according to Equations (1) and (2). Device 210 can provide C1 (i.e., distance from aircraft to top of load 208), C2 (i.e., distance from aircraft to pendant), while device 212 can provide C3 (distance from aircraft to ground). Control algorithm 104 uses C1, C2, and C3 to determine load height (LH), load length (LL), and a bucket height factor (BF). BF represents an offset that includes a length of additional chain or device 214 (See FIG. 3) that may be coupled to load 208 for lifting load 208 by pendant. Chain/device 214 adds additional length to Equation (1) under tension as shown in FIG. 3.

$$\text{Load Height} = \text{for } [n_{1-\infty}, \text{if}(((C2_n+BF)=C1_n), C3-C1, \text{``} \text{''}), \text{until Load height} \neq \text{`` ''}] \quad (1)$$

$$\text{Min Altitude} = \text{Load Height} + \text{Safety Margin} \quad (2)$$

Where:
Min Altitude=Minimum altitude for aircraft during load release;
Load Height=Height of top of load Above Ground Level (AGL);
C1=Distance from aircraft to top of load;
C2=Distance from aircraft to Pendant;
C3=Distance from aircraft to ground; and
BF=Bucket height Factor.

According to Equation 1, LH is iteratively processed until C1 equals C2 and BF. BF may be predetermined or unknown upon which Equation (1) can include an open loop. When C2 and BF equals C1 and is not varying in time, then cable sling assembly 206 is slack, and LH equals a difference between C3 and C1. If LH is initially calculated, and C1 later begins to negatively separate or deviate from C2 and BF, then sling assembly 206 may have missed the load or does not have correct tension and the load height (LH) measurement during the descent state may be rejected requiring recapture. Additionally, once LL has been determined from Equation (1), the FCS 102 can establish a minimum altitude for operations with a predetermined or open loop safety margin. Minimum altitude for operations includes safe altitudes of flight for VTOL aircraft 200 to ensure that the load 208 does not strike the ground or obstacles during a flight plan or prematurely during decent/delivery.

FIG. 3 illustrates an exemplary view of a VTOL aircraft 200 that is shown during a lift state according to an embodiment of the invention. In the lift state, VTOL aircraft 200 has made an attachment to load 208 through sling assembly 206 and additional chain/device 214 and VTOL aircraft 200 starts lifting up. With continued reference to FIG. 1, as VTOL aircraft 200 ascends or lifts, sensor information is received from sensors 106 and 108 by FCS 102 in order to determine LL as well as a stack-up of various lengths for linkages from bottom of VTOL aircraft 200 to ground according to Equations (3) and (4). Sensor information can include weight on pendant and load on pendant. The stack-up of information is provided to FCS 102 in order to identify safe limits when the load should hit the ground from an elevated position so that during flight, a final delivery, and descent state, VTOL aircraft 200 does not descend below an unsafe height.

$$\text{Load Length} = \text{for } [n_{1-\infty}, \text{if}(((C1_{n+1}-C2_{n+1})-(C1_n-C2_n))=0, C3, \text{`` ''}), \text{until Load height} \neq \text{`` ''}] \quad (3)$$

$$\text{Load Height} = C3 - C1 \quad (4)$$

Where:
Load Height=Height of top of load Above Ground Level (AGL);
C1=Distance from aircraft to top of load;
C2=Distance from aircraft to Pendant; and
C3=Distance from aircraft to ground.

In embodiments, C1 and C2 can be the same value such as, for example, when an additional chain/device 214 is not connected to load 208. In an absence of chain 214, BF (from Equation (1)) is equal to zero. However, with a chain/device 214, additional length of chain/device 214 provides a difference between C1 and C2. At this time, lengths for cable sling assembly 206 and BF (sling length), LH, and LL are calculated and stored in control system 200.

FIG. 4 illustrates an exemplary view of a VTOL aircraft 200 that is shown during a delivery and descent state according to an embodiment of the invention. With continued reference to FIG. 1, in a delivery and descent state, FCS 102 can use LL that was determined from the lift state (FIG. 3) to identify safe zones for delivering cargo 208, path planning so as to avoid obstacles that may contact load during flight, and pilot operations. As VTOL aircraft 200 descends, sensors 106, 108 receive and provide information to FCS 102 for implementing control algorithm 104 by processor 114 in order to determine LH and minimum altitude for VTOL aircraft 200 during load release according to Equation (5). Control algorithm 104 iteratively processes Equation (5) as VTOL aircraft 200 descends until the C1 current reading diverges from the C1 previous reading whereby LL is then equal to C3 and the load 208 is safely on the ground.

$$\text{Load Length} = \text{for } [n_{1-\infty}, \text{if}((C1_{n+1} - C1_n) = 0, C3, \text{" "})] \quad (5)$$

Where:
C1=Distance from aircraft to top of load; and
C3=Distance from aircraft to ground.

In another embodiment, sensor information obtained during an initial descent state or a lift state is not available for FCS 102, for example, if load 208 was a pre-prepared load. In this instance, sensor information can be acquired by sensors 106, 108 during a delivery and descent state. For example, sensors can provide information as to when load 208 has hit the ground. For example, sensor information can provide information to FCS 102 regarding when cable assembly 206 becomes slack. FCS 102 can determine if the load is on the ground based on converging values between C1 and C3. Upon receiving sensor information that confirms that load 208 is on the ground, FCS 102 can provide a signal to pendant in order to release load 208 or, alternatively, release cable assembly 206 thereby releasing the load 208.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. For instance, aspects of the invention are not limited to propeller blades for aircraft, and can be used in wind turbines and other systems with rotary elements. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for determining length of load sling assembly in an aircraft, comprising:
   receiving, with a processor, information via one or more sensors regarding a load length during a delivery and descent state, the load length comprising length of a load sling assembly and a load height;
   controlling, with the processor, a minimum altitude of operation of the aircraft that ensures that the load does not touch a ground or obstacles during one or more of a flight plan, during decent, or during delivery;
   determining, with the processor, when a load has touched the ground during load release in response to the receiving of the load length information; and
   releasing, with the processor, the load from the load sling assembly when the processor determines that the load has touched the ground.

2. The method of claim 1, further comprising determining the load height during an initial descent state.

3. The method of claim 1, wherein the determining of the load height during the initial descent state further comprises determining the load height from one or more of a distance of the aircraft to each of the load, a pendant, a bucket height factor, and the ground.

4. The method of claim 1, wherein the receiving of the information regarding the load length further comprises receiving information regarding the load height during a lift state.

5. The method of claim 1, wherein the receiving of the load height information during the lift state further comprises determining the load height as a function of a distance of the aircraft to the load and a distance of the aircraft to the ground.

6. The method of claim 5, wherein the receiving of the load height information during the lift state further comprises determining the load length through successive iterations of the difference between the distance between the aircraft to each of the load and the pendant.

7. The method of claim 1, further comprising navigating the load to a landing site in response to receiving the load length information during the delivery and descent state.

8. A system for determining length of load sling assembly in an aircraft, comprising:
   one or more sensors coupled to the aircraft;
   the load sling assembly including a sling coupled to an attachment device and a load; and
   memory having instructions stored thereon that, when executed by the processor, cause the system to:
      receive information regarding a load length during a delivery and descent state, the load length comprising a length of the load sling assembly and a load height;
      control a minimum altitude of operation of the aircraft that ensures that the load does not touch a ground or obstacles during one or more of a flight plan, during decent, or during delivery;
      determine when a load has touched the ground during load release in response to the receiving of the load length information; and
      release the load from the load sling assembly when the processor determines that the load has touched the ground.

9. The system of claim 8, wherein the processor is configured to determine the load height during an initial descent state.

10. The system of claim 8, wherein the processor is configured to determine the load height from one or more of a distance of the aircraft to each of the load, a pendant, a bucket height factor, and the ground.

11. The system of claim 8, wherein the processor is configured to receive information regarding the load height during a lift state.

12. The system of claim 8, wherein the processor is configured to determine the load height as a function of a distance of the aircraft to the load and a distance of the aircraft to the ground.

13. The system of claim 12, wherein the processor is configured to determine the load length through successive iterations of the difference between the distance between the aircraft to each of the load and the pendant.

14. The system of claim 8, wherein the processor is configured to navigate the load to a landing site in response to receiving the load length information during the delivery and descent state.

* * * * *